US009912600B1

(12) United States Patent
Attarwala et al.

(10) Patent No.: US 9,912,600 B1
(45) Date of Patent: Mar. 6, 2018

(54) DYNAMIC DISCOVERY OF NETWORK PACKET SIZE

(71) Applicant: vIPtela Inc., San Jose, CA (US)

(72) Inventors: Murtuza Attarwala, Sunnyvale, CA (US); Venu Hemige, San Ramon, CA (US)

( * ) Notice: Subject to any disclaimer, the term of this patent is extended or adjusted under 35 U.S.C. 154(b) by 187 days.

(21) Appl. No.: 14/534,683

(22) Filed: Nov. 6, 2014

(51) Int. Cl.
*H04L 12/805* (2013.01)
*H04L 12/24* (2006.01)
*H04L 29/08* (2006.01)

(52) U.S. Cl.
CPC ........ *H04L 47/365* (2013.01); *H04L 41/0813* (2013.01); *H04L 67/104* (2013.01)

(58) Field of Classification Search
CPC ....... H04W 4/001; H04W 80/06; H04W 8/26; H04W 24/08; H04W 28/20; H04W 28/22; H04W 36/00; H04W 36/36; H04W 40/02; H04W 48/16; H04W 4/12; H04W 60/00; H04W 80/04; H04W 84/12; H04W 88/04; H04W 8/005
USPC .................................................. 370/252, 400
See application file for complete search history.

(56) References Cited

U.S. PATENT DOCUMENTS

| 2003/0185208 | A1* | 10/2003 | Lee | H04L 45/12 370/389 |
| 2007/0171828 | A1* | 7/2007 | Dalal | H04L 47/365 370/235 |
| 2008/0298376 | A1* | 12/2008 | Takeda | H04L 12/2697 370/400 |
| 2015/0381509 | A1* | 12/2015 | Sreeramoju | H04L 47/365 370/252 |

* cited by examiner

*Primary Examiner* — Marsha D. Banks Harold
*Assistant Examiner* — Natasha W Cosme
(74) *Attorney, Agent, or Firm* — Maschoff Brennan

(57) ABSTRACT

A computer-implemented method for facilitating communications between two peer nodes in a network. The method comprises (a) configuring a first of the peer nodes to transmit a Path Maximum Transmission Unit (PMTU) request to a second of the peer nodes; wherein the PMTU request comprises a PMTU test value; (b) configuring the second peer node to transmit a PMTU reply responsive to receiving the PMTU request; said PMTU reply comprising a PMTU value set to match the PMTU test value in PMTU request; and (c) configuring the first peer node to determine a PMTU for the network based on determinations of fragmentation in connection with the PMTU reply.

10 Claims, 8 Drawing Sheets

Table illustrating MTU Convergence

| PMTU Request # | MTU Test Value | Diff | Fragmentation |
|---|---|---|---|
| 1 | 1500 | - | y |
| 2 | 750 | 750 | n |
| 3 | 1125 | 375 | y |
| 4 | 937.5 | 187.5 | n |
| 5 | 1031.25 | 93.75 | y |
| 6 | 984.38 | 46.87 | n |
| 7 | 1007.81 | 23.43 | y |
| 8 | 996.10 | 11.71 | n |
| 9 | 1001.95 | 5.85 | y |
| 10 | 999.03 | 2.92 | n |

FIG. 8

DYNAMIC DISCOVERY OF NETWORK PACKET SIZE

FIELD

Embodiments of the present invention relate to networking.

BACKGROUND

Internet Protocol (IP) networks such as the Internet have a maximum packet size that can be transmitted between a sending node and a receiving node in the network. This maximum packet size is referred to as the maximum transfer unit (MTU). If a packet size exceeds the MTU for a network then the packet has to be fragmented into multiple packets, each of a size that does not exceed the MTU. The multiple packets are then transmitted by the sending node to the receiving node where they are reassembled to recover the original packet.

Fragmentation is a big problem, especially with overlay networks becoming prominent, because it forces a receiving Customer-Premises Equipment (CPE) device to either do reassembly, so that inner packet can be forwarded, or to drop the inner packet if reassembly is not supported. Neither of these two options is attractive.

Fragmentation is an issue in general because the MTU is configured statically, and there is no way for two end nodes to negotiate the data packet size over IP networks. The problem is exacerbated by the presence of stateless devices along a network path, which are not capable of supporting the Internet Control Message Protocol (ICMP) packet too big/fragmentation is needed message in respect of packets sent with a Don't Fragment (DF) flag set. On the flip side with devices capable of sending ICMP packet too big messages, there is a potential of these messages flooding the sending CPE. With the Transmission Control Protocol (TCP) there is an option to exchange Maximum Segment Size (MSS). Thus one can for, e.g., adjust the MSS in TCP Syn packets, but even then, the best value is not known, without knowing the maximum MTU supported on the entire path. Moreover, for the User Datagram (UDP) protocol, the latter option is not available.

SUMMARY

In one aspect there is provided a computer-implemented method for facilitating communications between two peer nodes in a network. The method comprises (a) configuring a first of the peer nodes to transmit a Path Maximum Transmission Unit (PMTU) request to a second of the peer nodes; wherein the PMTU request comprises a PMTU test value; (b) configuring the second peer node to transmit a PMTU reply responsive to receiving the PMTU request; said PMTU reply comprising a PMTU value set to match the PMTU test value in PMTU request; and (c) configuring the first peer node to determine a PMTU for the network based on determinations of fragmentation in connection with the PMTU reply.

Other aspects of the invention will be apparent from the detailed description below.

BRIEF DESCRIPTION OF THE FIGURES

FIG. 8 illustrates how the MTU test values used for MTU discovery converge to a value, in accordance with one embodiment of the invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention. Accommodate Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
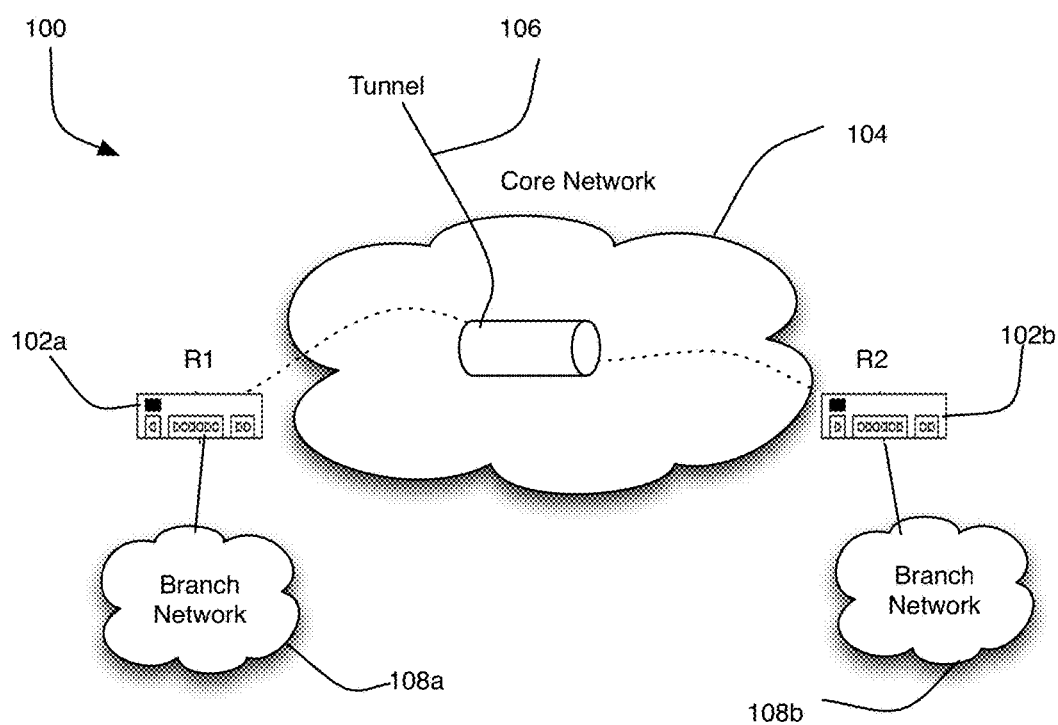
FIG. 1 shows a block diagram of network apparatus, in accordance with one embodiment of the invention.
Figure 2:
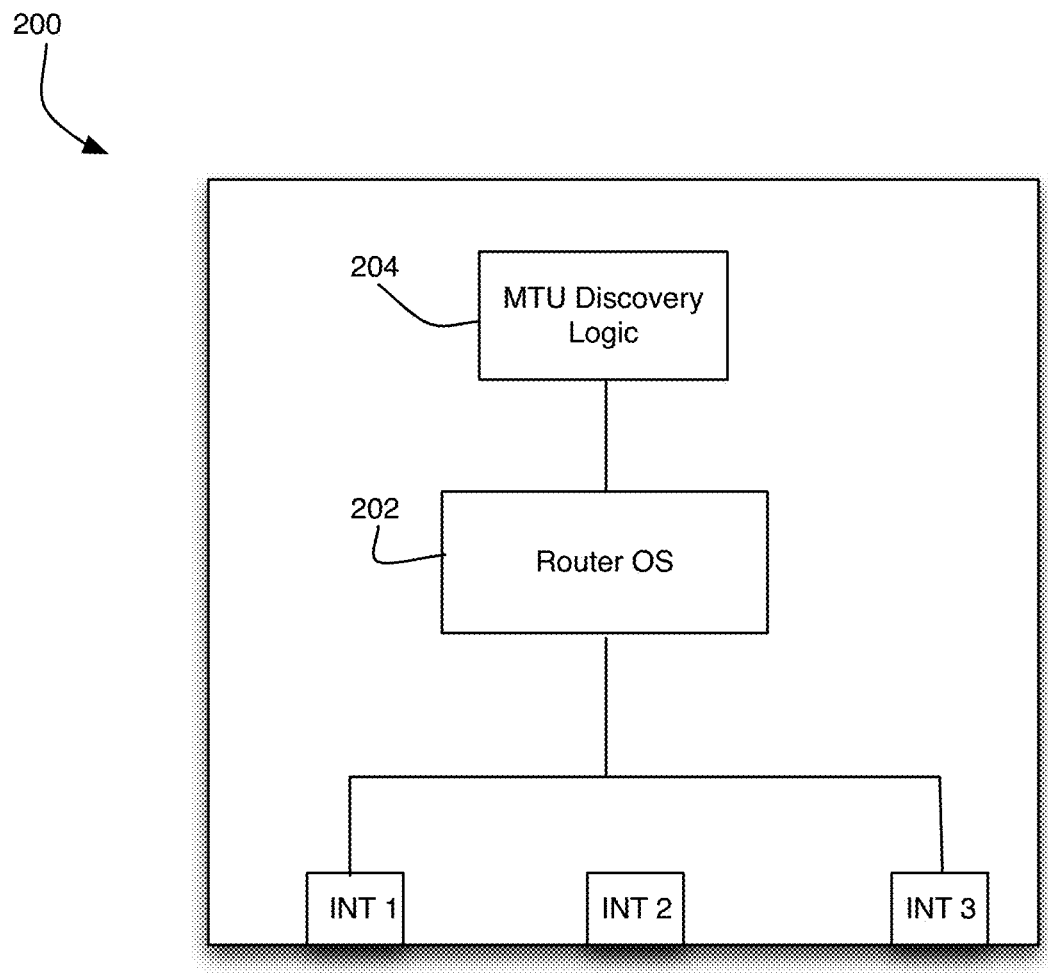
FIG. 2 shows a block diagram of a router, in accordance with one embodiment of the invention.
Figure 5:
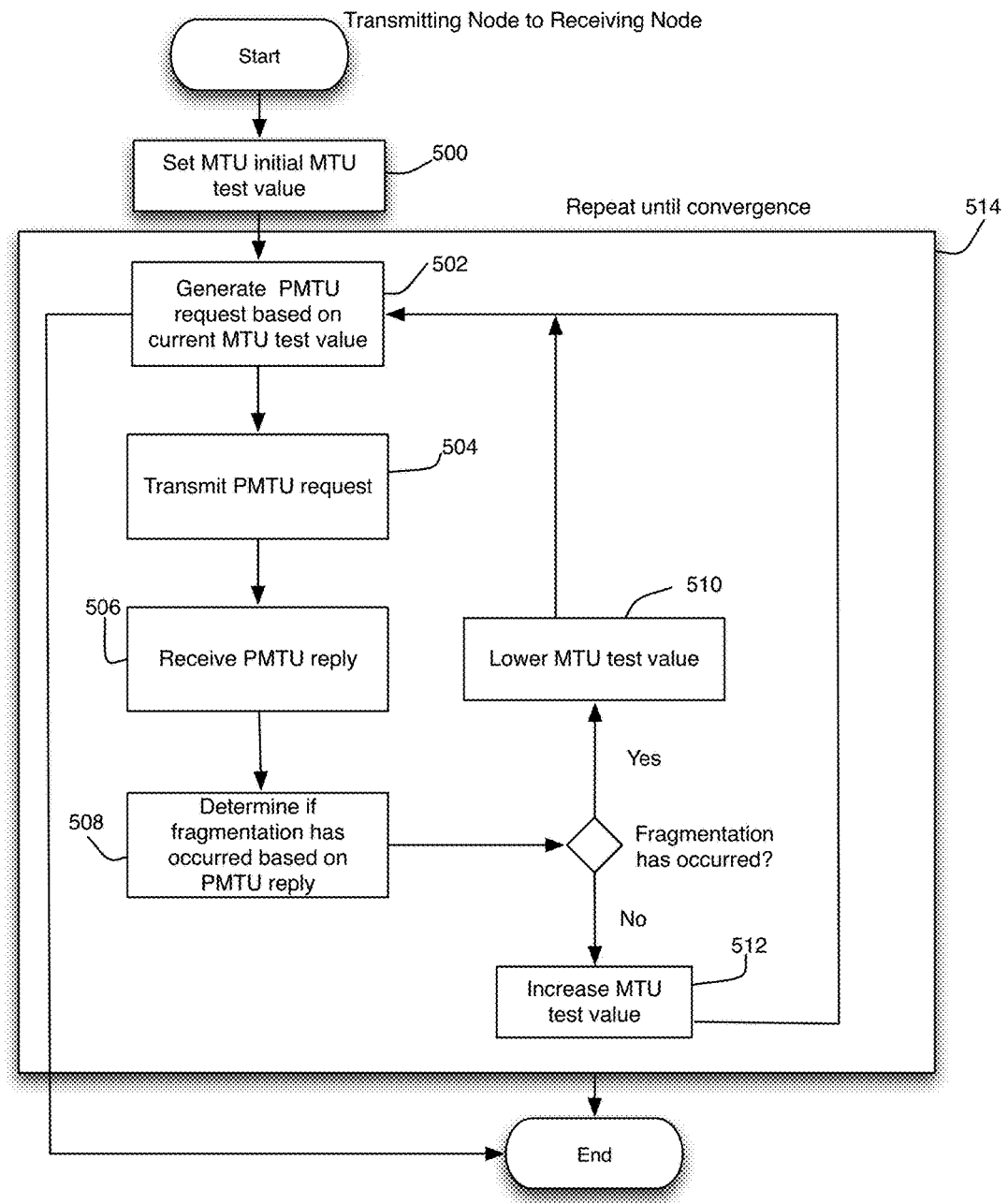
FIG. 5 shows a flowchart a transmitting node/router to dynamically discover the MTU for a network, in accordance with one embodiment of the invention.

Referring more specifically to the drawings, for illustrative purposes the present invention is embodied in the apparatus shown in FIGS. 1-2 and the method outlined in FIG. 5. It will be appreciated that the apparatus may vary as to configuration and as to details of the parts, and that the method may vary as to details and the order of the steps, without departing from the basic concepts as disclosed herein.

The invention is disclosed generally in terms of a method and system for dynamic MTU discovery, although numerous other uses for the invention will suggest themselves to persons of ordinary skill in the art.

Referring first to FIG. 1, there is shown a block diagram of a network system 100 suitable for use with the present invention. The network 100 may comprise a Local Area Network (LAN), Wide Area Network (WAN), or other network topology utilizing routers as is known in the art, including for example Internet service providers with backbone connections.

Network 100 includes a plurality of routers, identified as router R1 (designated as 102a), and router R2 (R2 designated as 102b) configured as routing peers in a peer-to-peer connection through a crore network 104 which supports communications based on the Internet Protocol (IP), in one embodiment. Routers 102a through 102b comprise conventional data processing means or computers, and as such, comprise conventional hardware components (not shown) including a central processor unit (CPU), memory (volatile and non-volatile), and input/output devices as is known in the art. It is noted that the network 100 comprising two router devices is only illustrative and that the invention is suitable for use with other network topologies.

Each router 102a and 102b further comprises a plurality of data interface ports between which data is routed to other devices and through which the router is coupled to the other devices. As depicted in FIG. 1, R1 (102a) is coupled to R2 (102b) via a tunnel link 106, which may be realized as an Internet Protocol Security (IPSec) tunnel, in one embodiment. Further, R1 is connected to a branch network 108a and R1 is connected to a branch network 108b.

FIG. 2 shows a router device 200 in accordance with one embodiment of the invention. Routers R1 and R2 are configured substantially as the router 200 described herein. The router 200 comprises conventional hardware components (not shown) including a CPU, memory, and input/output devices. A router operating system 202 is loaded during the startup of the router 200 and provides the basic command functions for the routing device as well as various components which provide specific functions or routines provided by the router 200. A MTU discovery algorithm 204 is loaded during startup to enable the router 200 to dynamically determine the MTU for the core network 104, as will be described. The router device 200 also include communications interfaces INT1, INT2, and INT3 whereby the device is able to communicate with other devices in a network.

In one embodiment, the MTU discovery algorithm 204 may configure each router R1/R2 of the network 100 to periodically exchange MTU-sized packets to determine which MTU-sized packets can be sent and received without getting fragmented in the network 100. The MTU-sized packed are sent as a MTU test packet. In accordance with one embodiment, a MTU test packet with the standard/maximum MTU size (e.g. 1500 bytes) is initially sent from one of the routers R1, R2. If fragmentation occurs then the MTU test packet size can be progressively lowered until it reaches the minimum MTU size of 576 bytes. The packets may be exchanged periodically with a tunable back-off time, in one embodiment.

Since the MTU test packets are exchanged periodically, any MTU changes in the core network 104 will be detected and the MTU of the link/tunnel 106 which is connected to the core network 104 can be readjusted. With this approach, a CPE device (R1 or R2) can fragment inner packets, e.g. when using UDP, forwarded through the tunnel 106 in cases where the inner packets exceed the MTU size. Alternatively, the CPE device can dynamically adjust TCP MSS adjust for TCP flows to match the MTU size associated with the network 104. Advantageously, adjusting the MTU to the maximum MTU supported along the network path, also reduces the possibility of being flooded with ICMP packet too big messages.

For the periodic MTU test packets exchanged between the two CPE devices, the CPE device originating the packet, may initiate the exchange with the standard/maximum core network MTU, as the data of the packet, and may check the total length of the received IP packet against this value. If there is no fragmentation in the network then these values would be same, otherwise the sender will try with half the original value. If there is no fragmentation, then the sender will increase the MTU value to (previously tried value+most recent value)/2, and retry. The sender may be configured to continue increasing the MTU until it notices fragmentation on the link. The sending CPE device may be configured to only wait for a specified amount of time for the reply before lowering the MTU and retrying, as there could be devices in the network that are not able to forward ICMP packet too big packets. For the periodic MTU test packets, in one embodiment Bidirectional Forwarding Detection (BFD) packets with the TLV extension may be used, where the Type-Length-Value (TLV) suggests that the value present is the sender's understanding of the MTU on the link connected to the core network. In addition to MTU sized packets, there will be regular BFD packets exchanged between a pair of CPEs to make sure that the path between them is healthy, and to measure various performance characteristics like loss and latency. In one embodiment, based on an increase in loss/latency beyond a certain threshold, the MTU recalculation may be triggered.

Figure 3A:
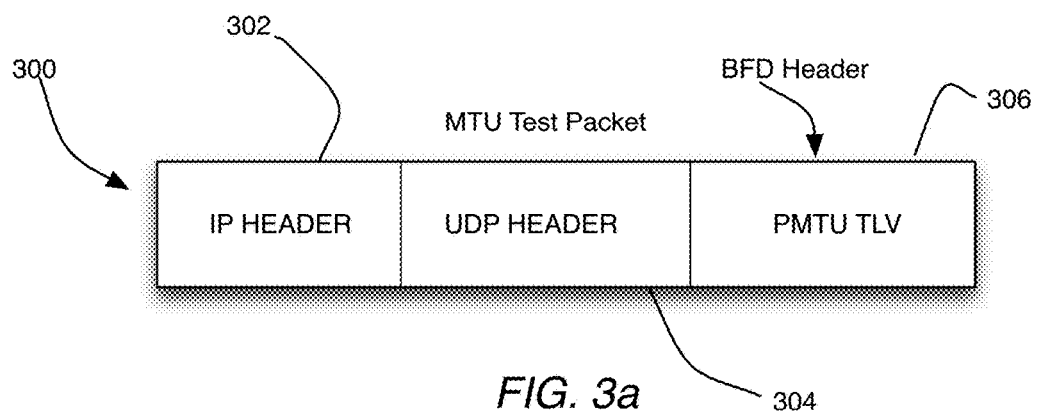
FIG. 3a shows the structure of a MTU test packet, in accordance with one embodiment of the invention.
Figure 3B:
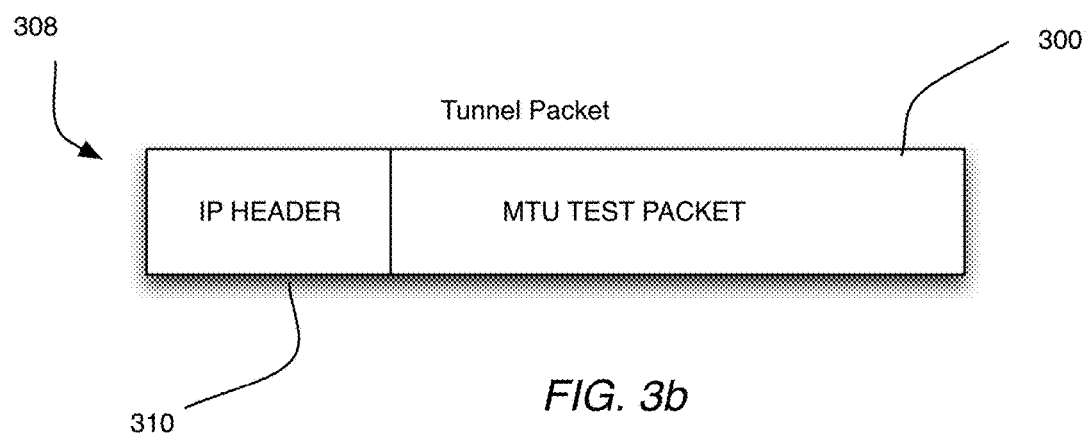
FIG. 3b shows the structure of an encapsulated MTU test packet, in accordance with one embodiment of the invention.

Referring now to FIG. 3a of the drawings, reference numeral 300 generally indicates a MTU test packet, in accordance with one embodiment. As will be seen the MTU test packet 300 comprises an IP header 302, a UDP header 304, and a Path MTU (PMTU) TLV 306. FIG. 3b shows the MTU test packet 300 encapsulated as tunnel packet 308. The tunnel packet 308 includes its own IP header 310 and a payload defined by the MTU test packet 300.

Figure 4A:
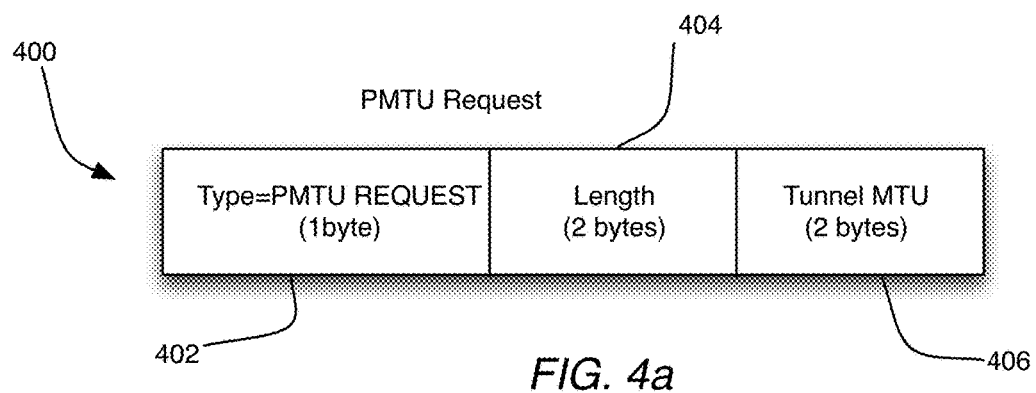
FIG. 4a shows the structure of a MTU request, in accordance with one embodiment of the invention.
Figure 4B:
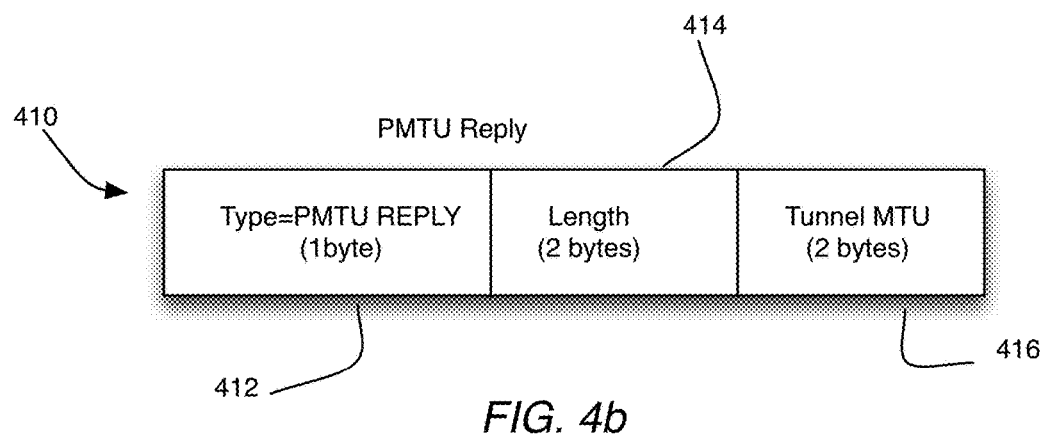
FIG. 4b shows the structure of a MTU reply, in accordance with one embodiment of the invention

In one embodiment there are two variations of the PMTU TLV 306. The variations include a PMTU request and a PMTU reply. An exemplary PMTU request 400 is shown in FIG. 4a of the drawings. The request 400 comprises portions 402, 404, and 406. The portion 402 specifies a type (PMTU request), the portion 404 specifies the length of the PMTU request (5 bytes), and the portion 406 specifies the tunnel MTU size being tested. An exemplary PMTU reply 410 is shown in FIG. 4b of the drawings. The reply 410 comprises a portions 412, 414, and 416. The portion 412 specifies a type (PMTU reply), the portion 414 specifies the length of the PMTU reply (5 bytes), and the portion 416 specifies the tunnel MTU size being tested.

Figure 6:
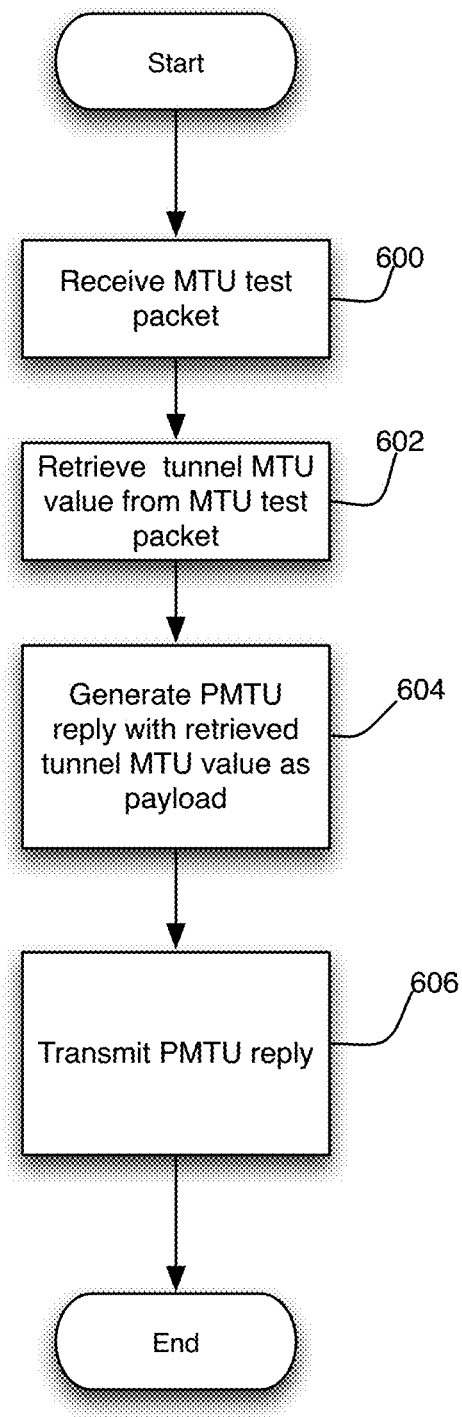
FIG. 6 shows a flowchart a receiving node/router to dynamically discover the MTU for a network, in accordance with one embodiment of the invention.
Figure 7:
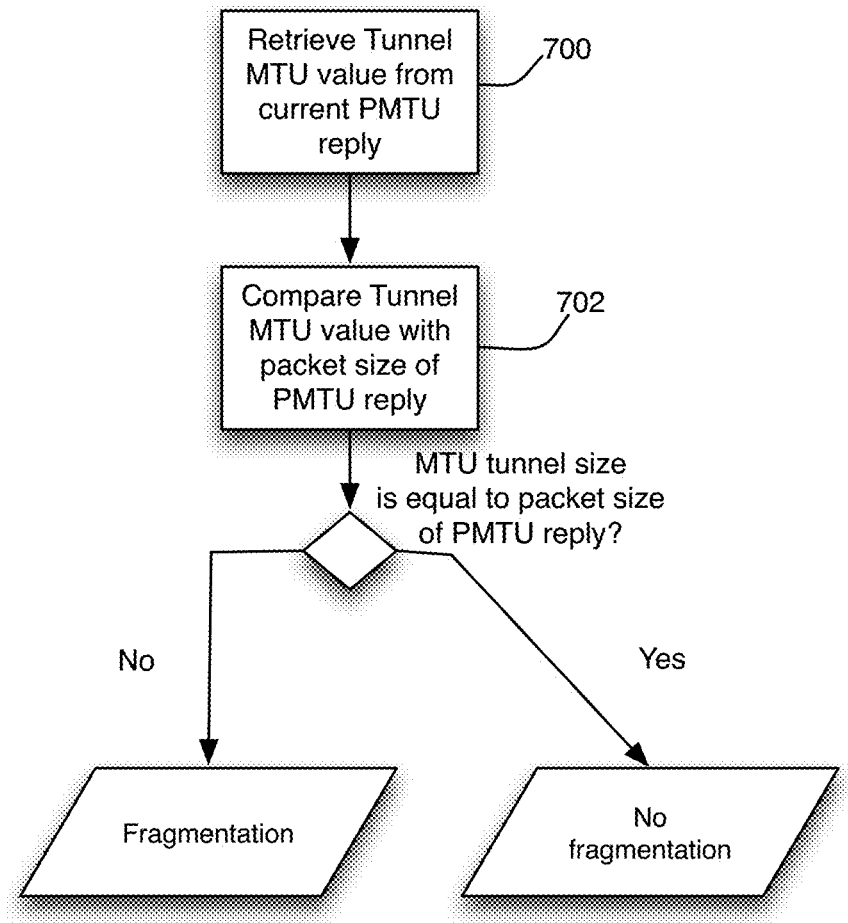
FIG. 7 shows the particular steps performed in order to determine if fragmentation has occurred in one embodiment of the invention.

FIGS. 5 to 7 of the drawings illustrate aspects of the MTU discovery algorithm, in accordance with one embodiment of the invention. In particular, FIG. 5, shows a flowchart of operations performed by a sending node, say R1, whereas FIG. 6 shows a flowchart of operations performed by a receiving node, say R2. Referring to FIG. 5, at block 500, R1 sets the initial MTU test value to begin the dynamic MTU discovery process. As noted earlier, this initial value is set to the standard/maximum MTU size (e.g. 1500 bytes). At block 502, R1 generates a path MTU (PMTU) request with the current MTU test value as the data of the PMTU request. Thus, for the first MTU test packet the size is 1500 bytes and the portion 406 of the PMTU request 400 is set to 1500 bytes. At block 504, R1 encrypts the PMTU request as a tunnel packet and transmits it to the router R2.

Turning now to FIG. 6, the route R2 receives the PMTU request at block 600. At block, 602, the tunnel MTU value carried as data of the PMTU request is retrieved. For the first PMTU request, this value is 1500. The router R1 generates a PMTU reply at block 604 with the retrieved tunnel value being written as the data of the reply packet in the portion 416 of the reply 410. At block 606, the router R2 transmits the PMTU reply as a tunnel packet to the router R1.

Referring again to FIG. 5, at block 506 the router R1 receives the PMTU reply from the router R1 and executes a block 506 to determine if fragmentation has occurred based on the PMTU reply. The particular steps performed in order to determine if fragmentation has occurred in one embodiment is illustrated in FIG. 7. Referring to FIG. 7, at block 700 the tunnel MTU value carried as data by the PMUT reply is retrieved and compared with the packet size of the PMTU reply at block 702. If these values match then there was no fragmentation associated with the transmission of the PMTU reply. However, if these values do not match then fragmentation of the PMTU reply has occurred.

Turning again to FIG. 5, if fragmentation has occurred then block 510 executes to lower MTU test value. In one embodiment, the block 510 may be configured to halve the value of the current MTU test value. If there was no fragmentation, then the block 512 executes to increase the current MTU test value. As noted, the increased value may be set to the (previously tried value+most recent value)/2. The MTU test values generated by the blocks 510 and 512 are passed to the block 502 for generation of a new PMTU request based on the newly determined MTU test value.

Blocks 505 to 512 are configured to repeat as superblock 514, one embodiment. The block 514 executes until the MTU test value converges towards a certain value. The concept of convergence is illustrated by the Table 800 shown in FIG. 8. In the table 800, column 802 shows the number of the PMTU request. It will be seen that there have been ten PMTU requests. The column 804 shows the MTU test values associated with each PMTU request. The MTU test values were determined by the blocks 510 and 512 described above. The column 808 shows whether fragmentation occurred (a "y" means fragmentation occurred and an "n" means that there was no fragmentation). The column 806 shows the differences between the MTU test values between two successive PMTU requests. It will be seen that the differences get progressively smaller. For example, the difference between the second and first PMTU requests is 750, whereas the difference between the tenth and ninth PMTU requests is only 2.92. Thus, in one embodiment, the superblock 514 may be configured to execute until the difference in the MTU values associated with two successive PMTU requests is below a certain threshold say N (e.g. N may be 10).

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A computer-implemented method for facilitating communications between two peer nodes in a network, the method comprising:

configuring a first peer node of the two peer nodes to transmit a Path Maximum Transmission Unit (PMTU) request to a second peer node of the two peer nodes, wherein the PMTU request comprises a PMTU test value;

configuring the second peer node to transmit a PMTU reply responsive to receiving the PMTU request, wherein the PMTU reply comprises a PMTU value set to match the PMTU test value in the PMTU request; and configuring the first peer node to determine a PMTU for the network based on determinations of fragmentation in connection with the PMTU reply, wherein if the fragmentation is determined for an iteration n, then lowering the PMTU test value for a next iteration n+1, to half of the PMTU test value for the iteration n, wherein the method steps are repeated for a plurality of N iterations and a quantity of the plurality of N iterations performed are determined by taking a difference between PMTU test values used in two successive PMTU requests, and determining if the difference is below a pre-defined threshold, wherein the last used PMTU test value is set as the PMTU for the network.

2. The method of claim 1, wherein determining if the fragmentation has occurred is based on comparing a length of the PMTU reply with the PMTU test value associated with the PMTU reply.

3. The method of claim 1, wherein for an initial iteration, the PMTU test value is set to a maximum PMTU value that the network is capable of supporting.

4. The method of claim 3, wherein for an iteration n if there has been no fragmentation then increasing the PMTU test value for the next iteration n+1.

5. The method of claim 4, wherein increasing the PMTU test value comprises setting the PMTU test value for the next iteration n+1 to be equal to [PMTU value for the iteration n+PMTU value for the iteration n+1]/2.

6. A router comprising:

at least one interface for facilitating network communications with other devices in a network; and a Path Maximum Transmission Unit (PMTU) discovery logic to dynamically determine a PMTU for the network, wherein the at least one interface is configured to send packets to other devices in the network of a length equal to the PMTU determined for the network, and wherein dynamically determining the PMTU for the network comprises:

transmitting a PMTU test request to a peer node of the router, wherein the PMTU test request comprises a PMTU test value;

receiving a PMTU test reply responsive to the PMTU test request from the peer node, wherein the PMTU test request comprises a PMTU value set to equal the PMTU test value in the PMTU test request; and making determinations of fragmentation in connection with the PMTU test reply, wherein if fragmentation is determined, for an iteration n, then lowering the PMTU test value for a next iteration n+1, to half of the PMTU test value for the iteration n, wherein the steps of dynamically determining the PMTU for the network are repeated for a plurality of N iterations and a quantity of the plurality of N iterations performed are determined by taking a difference between PMTU test values used in two successive PMTU requests, and determining if the difference is below a pre-defined threshold, wherein the last used PMTU test value is set as the PMTU for the network.

7. The router of claim 6, wherein determining if the fragmentation has occurred is based on comparing a length of the PMTU test reply with a PMTU test value associated with the PMTU test reply.

8. The router of claim 6, wherein for an initial iteration, the PMTU test value is set to a maximum PMTU value that the network is capable of supporting.

9. The router of claim 8, wherein for an iteration n if there has been no fragmentation then increasing the PMTU test value for the next iteration n+1.

10. The router of claim 9, wherein increasing the PMTU test value comprises setting the PMTU test value for the next iteration n+1 to be equal to [PMTU value for the iteration n+PMTU value for the iteration n+1]/2.

* * * * *